Jan. 19, 1932.   W. C. EDWARDS, JR   1,841,718
COMPOSITE CONVEYING MECHANISM FOR COMBINES
Filed Feb. 3, 1930   2 Sheets-Sheet 2
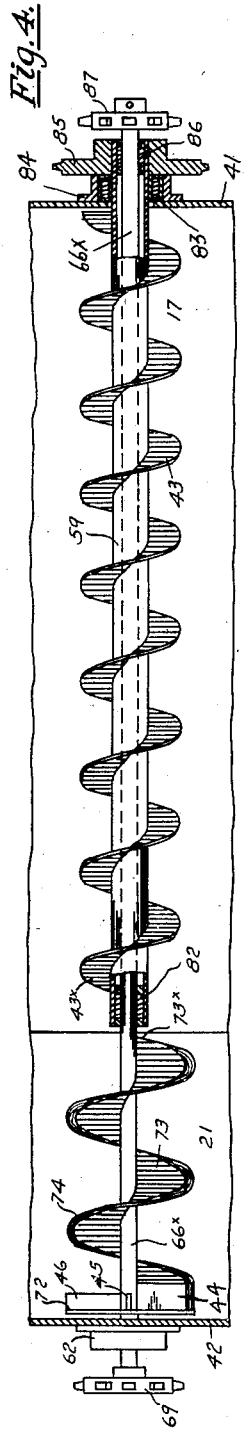
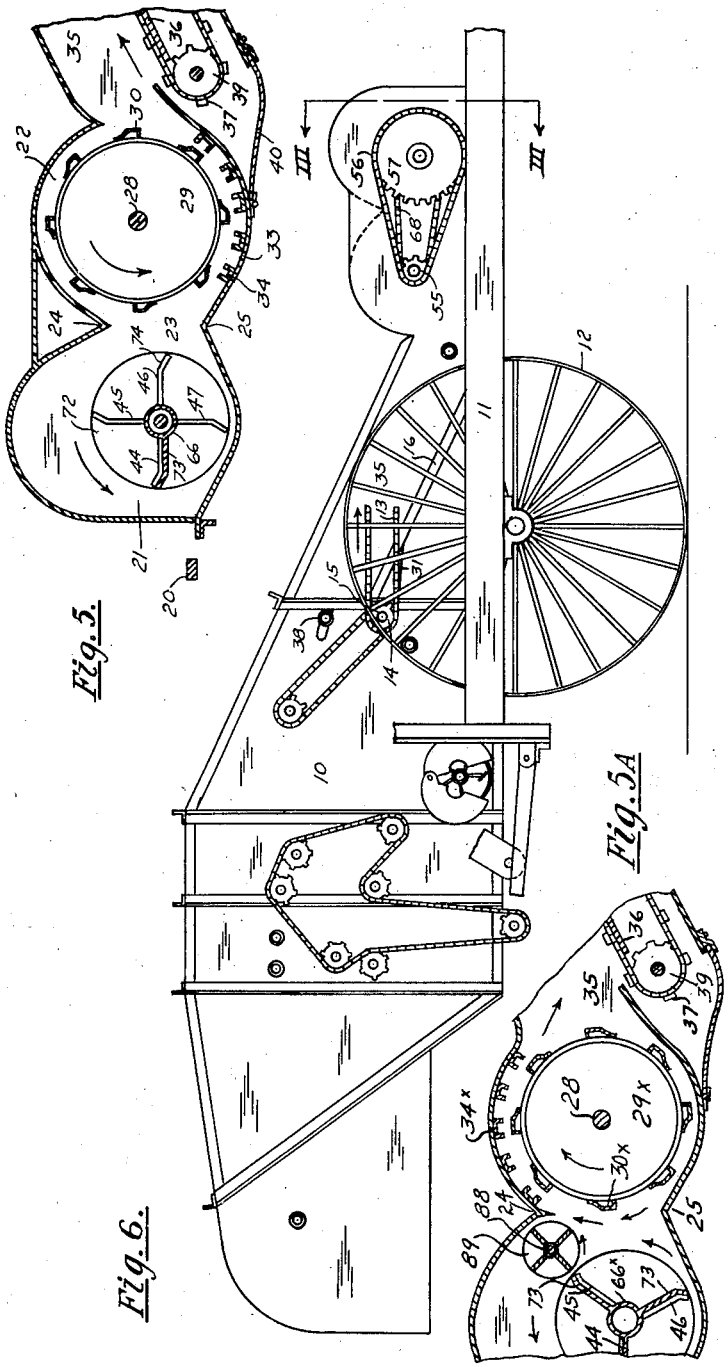
INVENTOR.
William C. Edwards, Jr.

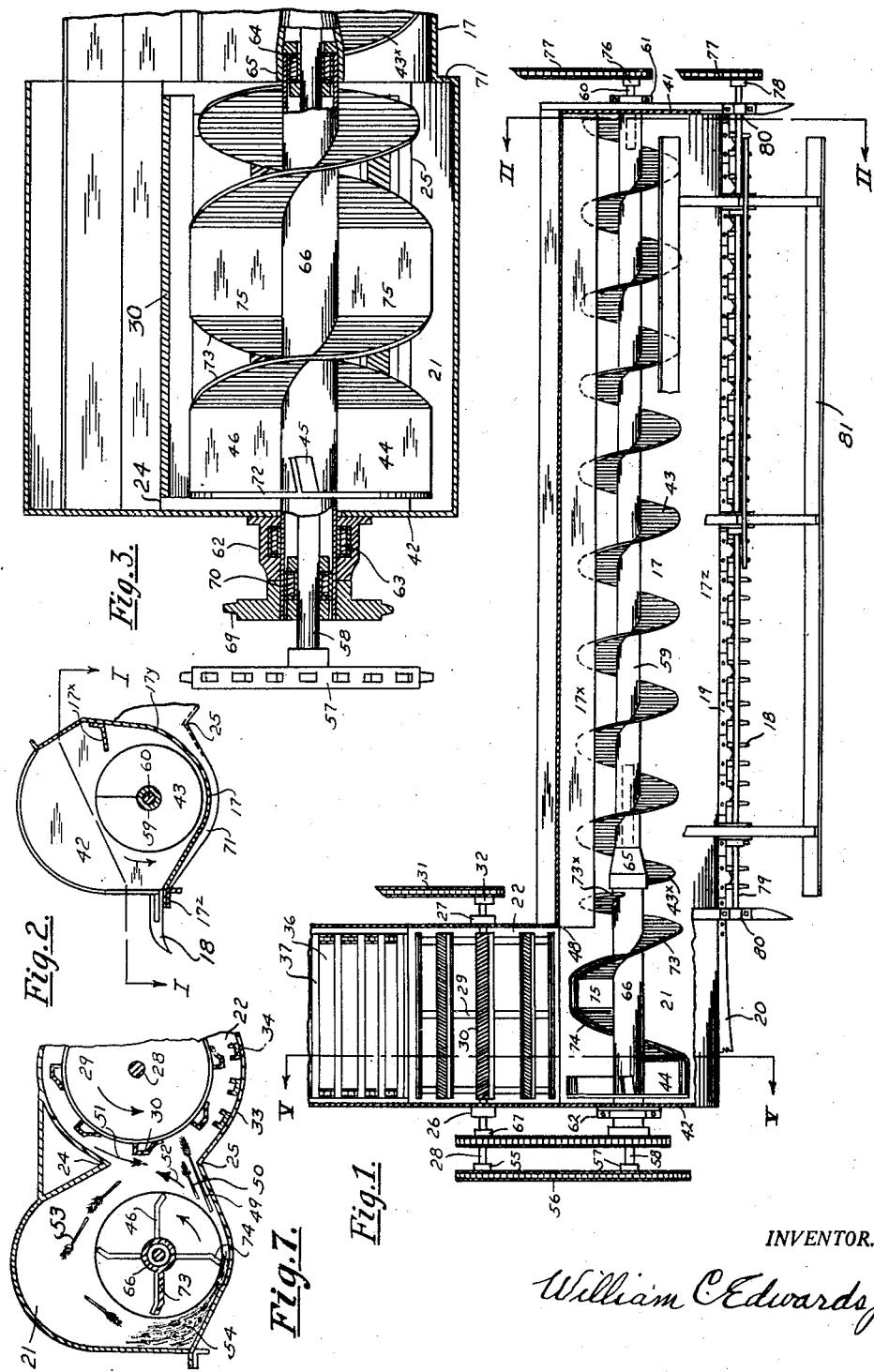

Patented Jan. 19, 1932

1,841,718

UNITED STATES PATENT OFFICE

WILLIAM C. EDWARDS, JR., OF KANSAS CITY, MISSOURI, ASSIGNOR TO SEARLES EDWARDS, OF KANSAS CITY, MISSOURI

COMPOSITE CONVEYING MECHANISM FOR COMBINES

Application filed February 3, 1930. Serial No. 425,607.

The invention relates to an improvement in a spiral conveyor and an impelling or fan mechanism, in combination, arranged in an end to end and axial relationship for promoting the longitudinal flow of straw and grain elements at a predetermined velocity while under the influence of the rotating spiral conveyor; and for then delivering said material from said primary spiral conveyor upon the receiving end of the impelling or fan mechanism, as a secondary conveyor rotating at a greater number of revolutions per minute than the primary conveyor. Whereupon the velocity of flow of said received elements is then increased and under the influence of said secondary mechanism, a change in the direction of flow is accomplished without congestion. The invention further relates to the rotation of the primary conveyor within a conveyor casing and for promoting the longitudinal flow of materials therein and therefrom into a fan or feeding chamber into which the conveyor casing empties; and there under the receiving influence of the more rapidly rotating secondary conveyor, said material is given a change in direction of flow and at a greater velocity through an outlet of the said fan chamber; the invention is particularly applicable as an improvement in the spiral conveyor and feeder mechanism as usually employed in combination harvester, thrasher and separators of that type which show a harvester platform on a subframe and having a conveyor casing at the rear of and in a receiving relation to the cutting mechanism. In my invention, a blower casing or feeding chamber provided with an outlet is arranged at one end of the conveyor casing and a screw conveyor is employed for advancing the harvested elements longitudinally of the casing and towards the feeding chamber. Another chamber is in direct communication with the feeding chamber and rotating means are employed within the feeding chamber for receiving advancing harvested elements from the screw conveyor and for continuing the flow of said elements into the feeding chamber and for changing the direction of said flow into the second chamber without retarding the advancement of later advancing harvested elements in the conveyor and feeding chamber.

The auger type of harvester platform has many advantages over the canvas and raddle types of harvester platforms. Among these may be mentioned that the elements are of longer life, they need substantially no mechanical repairs, they do not have to be removed during storms or at night, and they effect savings of grain since no prethrashed grains dribble off the cutting mechanism during the longitudinal flow of the harvested elements upon the harvester platform casing towards the thrashing cylinder. Furthermore, the harvested elements may be delivered directly to and distributed upon the thrashing mechanism. However this type of combine has not proven an unqualified success. Granting there were many advantages, the fact that the machine, as previously constructed, so frequently clogged in the feeding chamber has prevented it receiving the entire approval of the trade and farmers in general. It is the purpose of this invention to greatly improve upon the manner and method of conveying harvested elements to the feeding chamber and then feeding said elements into the second chamber of the combine, or so that these frequent stoppages in the feeding chamber may be entirely eliminated. These and other features of the invention will be more fully discussed in the description of the drawings and pointed out in the claims.

In the drawings, Fig. 1 represents a plan view of my improved harvester platform and thrasher, partly in section, and as taken along the line I—I in Fig. 2 to disclose operative mechanisms in their associated relationship on the subframe element of the combine shown in Fig. 6. Fig. 2 represents a sectional view of the platform device as taken along the line II—II, Fig. 1 and looking in the direction of the arrows. Fig. 3 shows a vertical sectional view as taken through the feeding chamber along the line III—III, Fig. 6 and looking in the direction of the arrows to disclose a side elevation of a compound feeding impeller device, similar in type to that seen in Fig. 1; and with other parts in section to show rotating elements of the device and their mountings. Fig. 4 shows a plan view of an alternate arrangement of the composite spiral conveyor and impeller mechanisms to that shown in Fig. 1 and with parts in section to illustrate mountings. Fig. 5 represents a vertical sectional view taken along the line V—V, Fig. 1 and looking in the direction of the arrows. Fig. 5A differs from Fig. 5 to show an overshot cylinder assembly and an auxiliary beater installation. Fig. 6 represents a left side elevation of the combine, with the motor and front wheel and truck assembly removed for clearness of illustration. Fig. 7 represents a view similar to that seen in Fig. 5, and shows the movements of short fluffy straw and the like, which in the past under the influence of the allied rotating elements has caused occasional clogging; and showing the causes and effects then produced which the present invention is intended to overcome. Similar numerals of reference indicate corresponding parts throughout all the figures of the drawings.

Referring to the drawings, the body 10 of the separator of my improved combine is supported by main frame elements such as the channel 11 carried by paired rear wheels 12. It is customary to provide this type of machine with a front caster wheel and carriage supporting forward frame elements 11, and to pull the machine by a tractor or animal power. The machine, however, may be self propelled, if deemed advisable. Within the body of the separator are operatively arranged the usual rack elements useful in separating grains, chaff and the like from thrashed elements; said separated elements being then delivered to actuated grain pan and chaffer means and thence to sieves and screens of a cleaning shoe mechanism and then to auger and elevator mechanisms for delivery to the cylinder for rethrashing or to bin or sacking means for disposal. The chain 13 is driven from the motor, not shown, and drives the sprocket 14 keyed to the main shaft 15. The shaft 15 carries other sprockets from which lead chains to drive the other sprockets and shafts actuating the mechanisms in the separator.

A subframe 16 is pivotally mounted, in Fig. 6, on the main frame of the machine by hinged means not shown but in axial alignment with the axis of the main shaft 15. The various supporting elements of the subframe lead forwardly from the separator and carry the thrasher and harvester elements and associated parts. The platform of the harvester includes a transverse hood or conveyor casing 17. The hood 17 includes a top element 17x as an abutment or baffle, and a downwardly and forwardly inclined rear wall forming a trough 17y connected with the rear edge of the abutment element. Forwardly presented fingers or guards 18 are carried along the forward edge 17z of the hood. Stripping or cutting mechanisms are employed in harvesters of this class. For illustration, I show the sickle 19 operating in the guards 18, in the usual manner, the pitman 20 being actuated by means not shown.

A blower casing or feeding chamber 21 having an outlet 23 is arranged at one end of the hood or conveyor casing and into which the hood discharges. Another chamber 22 is in direct communication with the blower casing 21 through the outlet 23 at the rear of the chamber 21 included between the top and bottom elements 24 and 25 respectively of the paired chambers. Journaled in bearings 26 and 27 in the side walls of the chamber 22 is the shaft 28 carrying a rotatable element such for instance as the cylinder 29 provided with beater bars 30, preferably of the rasp type. The chain 31, Fig. 1 is driven from a sprocket on the main shaft 15 and leads around a sprocket 32 keyed to the shaft 28 to rotate the cylinder in the direction shown by the arrow, in Fig. 5. A curved heavy plate 33 constitutes the base of the chamber 22. Riveted to the plate 33 are seen a plurality of transverse channels 34 forming a thrashing concave associated with the cylinder 29 as a thrashing mechanism. The chamber 22 is provided with an outlet passage 35 on the subframe 16 and leading into the body of the separator 10. Within the passage 35 is shown a floor 36 upon which drags the slatted chain raddle 37 driven by sprockets on the shaft 38 driven from shaft 15. The raddle 37 leads around the idler sprockets such as 39 positioned below the rear extended edge of the concave plate 33. At 40 is a clean out door for servicing the raddle 37. It is obvious that the thrashing and separating mechanisms may be differently situated and varied in character from that just described.

Journaled in the end wall 41 of the hood 17 and in the outer wall 42 of the impeller casing for feeding chamber 21 is my composite spiral conveyor and impeller assembly. The spiral conveyor is arranged at the rear of and in a direct receiving relation to the cutting mechanism and constitutes means for advancing harvested elements longitudinally of the hood to the rotary impeller in the impeller casing 21.

In the dominating Patent #1,244,152 fan blades, arranged within the feeding chamber, were fixed upon the shaft carrying the spiral conveyor in the hood. These blades received the flow of harvested elements as advanced longitudinally of the hood by the spiral conveyor. The feeding chamber had an outlet at the rear facing the separator. The blades were intended to divert this advancing flow and advance the harvested elements from the feeding chamber through this outlet. Harvested elements as drawn under the auger were cast upwardly on the rear wall of the hood and against a top element serving as an abutment or baffle in advance of the rear wall and longitudinally extending towards the outlet. The wall and top element thus functioned to prevent the harvested elements from wrapping the screw conveyor. The harvested materials during their longitudinal travel in the hood towards the feeding chamber, under the influence of the spiral conveyor, were in effect troweled and horizontally arranged in the space included between the top abutment, the rear wall and the spiral conveyor or so that an endwise flow of the harvested elements was continued to the feeding chamber where it met forces actuated by the blades on the conveyor shaft which served to divert and expel the current of harvested materials rearwardly through the outlet. Now if a thrashing cylinder 29 is arranged behind this outlet, as has been done, a condition detrimental to the free exit and flow of the harvested materials through the outlet is introduced and clogging within the feeding chamber and in the hood would frequently occur unless other influences were provided that would neutralize or eliminate the detrimental influences.

It is here observed that the fan blades, in the dominating U. S. Patent #1,244,152, being fixed on the shaft of the screw conveyor would necessarily rotate at the same number of revolutions per minute as the conveyor. The diameter and revolutions per minute of the screw conveyor is determined upon the sole necessity of properly receiving and turning the grain crop, as cut by the advancing cutting mechanism of the combine and as delivered by the reel upon the spiral conveyor, for a proper advance of this harvested crop longitudinally along the hood, under the top element 17x into the feeding chamber.

Referring to Figs. 2 and 7; the longitudinal flow of straw and the like, under the top element 17x, has created a longitudinal compacted grouping of harvested elements in the trough-like space 17y and which elements are advancing toward the wall 42 of the feeding chamber, under the influence of the spiral conveyor 43. If then the blades 44, 45, 46 and 47 rotate at the same number of revolutions per minute as the spiral conveyor 43, a tendency would of course be created to turn the straw rearwardly through the outlet 23 and into the chamber 22. The two forces, however, would be acting at right angles to each other and the resultant force would lead in a diagonal direction towards the end wall of the fan or feeding chamber and thus feed heavier on the far side of the cylinder and would not be properly directed to clear the feeding chamber. This is the first detrimental condition.

It is thus impossible for straw advancing at a constant velocity longitudinally of the trough 17y under the top element 17x, to make a right angle turn in the feeding chamber and be properly distributed over the width of the cylinder and not tend to obstruct later longitudinally advancing straw. Some means must be employed to speed up the flow of the straw stream as it skids around the corner 48 Fig. 1 and within the feeding chamber 21 or so that it can gain velocity and get away from the longitudinally flowing straw stream in the hood.

Clogging in the feeding chamber comes without warning. It most generally occurs while combining light fluffy straw, short straw and the like, especially if the platform is tilted forwardly to cut close to the ground. The operator first becomes conscious of the packed feeding chamber, when he sees the longitudinally augered straw rising and wrapping the reel. The combine must be stopped and the compacted straw removed before harvesting may be continued. If a short straw, as seen at 50, Fig. 7, be expelled from the blade 46 while revolving at the same number of revolutions per minute as the auger, as has been the prior custom, this straw would be advanced slowly against a heavy band of air following the bars 30 of the cylinder and as indicated by the descending arrow 51. This short straw might not penetrate this band of air far enough to overhang the edge 25 so that it could be carried rearwardly by a receding bar 30 of the cylinder. Instead the short straw tends to go into an eddy and flow upwardly as indicated by the arrow 52, tangent to the air band 51. Light fluffy straws, upwardly advanced in this manner, may be struck by the upper bars 30 of the cylinder 29 descending past the outlet element 24; thus these short straws would be driven back towards the rising blade 46 or so that the blade 46, in its turn, would strike the milling straws and hurl them as at 53 into the top of the feeding chamber 21 then to fall and start to pile up as at 54 in the forward portion of the chamber. This is the second detrimental condition and added to the first detrimental condition creates a situation that must be counteracted, if a proper flow of harvested elements through the outlet 23 or to the chamber 22 is to be maintained. The cylinder 29 did not necessarily clog but continued to thrash the majority of the flowing crop even while the pile 54 was growing. The sound of the operative elements and the continuation of the flow of cleaned grain to the bin and of thrashed straw off the straw spreader caused the operator to believe everything was running satisfactorily, until all of a sudden the observed straw wrapping the reel and he knew, instantly, that the feeding chamber was packed full of twisted straw. It is to overcome this unsatisfactory condition that the present invention is of value.

The shaft 28 Fig. 1 carries a small sprocket 55 driving the chain 56 to drive the large sprocket 57 keyed to the shaft 58. The shaft 58 is rigidly affixed to the tubular element 59 carrying the spiral conveyor 43, which terminates in the end shaft 60 journaled in the bearing 61 carried by the wall 41 of the hood 17. The chain 56 thus drives the spiral conveyor 43 at the necessary revolutions per minute to enable the hood 17 and conveyor 43 to properly handle the harvested elements and advance them under the top 17x and within the trough 17y towards the feeding chamber 21 in the preferred manner. At 62, rigid to the wall 42, is a housing for the self aligning bearing 63. At 64 is another bearing arranged on the shaft 58 adjacent the end 43x of the spiral conveyor 43 and covered by the flared conical end 65 of the tube 59. A rotary impeller arranged within the feeding chamber comprises a tubular element 66 in axial alignment with the shaft 58 and rotating in the bearing 63 and around the bearing 64. The sprocket 67 on the shaft 28 drives the chain 68 to drive the sprocket 69 rigid to the roller 66, or so that the roller 66 will rotate at a greater number of revolutions per minute than the screw conveyor 43. The end of the shaft 58 is journaled in the bearing 70 within the tube 66. The end 43x of the spiral conveyor terminates near the outlet of the hood 17 and is preferably curved down to the end of the tube 59.

The feeding chamber 21 preferably drops down at 71 below the hood 17 and as seen in Figs. 2 and 3. Concentric with and rigid to the impeller tube 66 is a disc plate 72 adjacent the wall 42, from which extend a plurality of blades 44, 45, 46 and 47 rigid to and radiating from the roller 66. These blades may stand at an angle to the axis of the tube 66 as seen at 45, Fig. 3 to exert a force tending to drive straw away from the disc 72. From the blade 44 a spiral element 73 leads towards the end 43x of the screw conveyor; it is obvious that blades other than the blade 44 may also be provided with a spiral element 73, for instance as indicated in Figs. 3 and 5A. The element 73 is rigidly affixed to the element 66 and is curved down like the end of a screw at 73x to the tube 66 and near the end of the tube 59 of the spiral conveyor 43. The member 66 is preferably smaller in diameter than the member 59 at their opposing ends. The blades and spiral element 73 may be larger in diameter than the spiral conveyor 43, if the floor of the feeding chamber is lower than the base of the hood 17 as indicated at 71. I preferably bend the edges of the blades 44, 45, 46 and 47 and the edge of the spiral element 73 as indicated at 74 in Figs. 1, 4, 5, 5A and 7 so that the harvested elements as advanced by the troweling edge 74 of the blades and spiral element 73, including the blade 75, will be given a back spin and skidded across the edge 25 of the outlet without being cupped upwardly as indicated by the arrow 52. The blade 75 is merely an offset in the spiral element 73 intermediate the end portion 73x and the plate 72 and is preferably arranged opposite to but in the plane of its companion blade, such as the blade 44, Fig. 1. A sprocket 76 carried by the shaft 60 drives the chain 77 to drive the sprocket 78 on the reel shaft 79 journaled in bearings of reel supporting brackets as at 80. At 81 is the harvester reel carried by the rotatable shaft 79.

Referring to Fig. 4; the tube 59 of the spiral conveyor 43 rotates around the bearing 82 mounted on the shaft 66x carrying the rotary screw impeller 73. The other end of the tube 59 rotates in the bearing 83 mounted in the box 84 supported on the wall 41 and carried the sprocket 85 keyed thereto. Within the tube 59 is the end bearing 86 for the shaft 66x. The other end of the shaft 66x is mounted on a bearing in the box 62 and is driven by the sprocket 69 actuated by the chain 68. The sprocket 87 rigid to the shaft 66x provides a means for transmitting power through chain and jack shaft means not shown and to rotate the sprocket 85 to drive the screw conveyor 43 and the reel 81 as will be readily understood. The shaft 66x, carrying the fan and impeller mechanism, rotates at a greater number of revolutions per minute than the tube 59 carrying the spiral conveyor 43 for the same purpose as previously described with reference to the alternate mechanism seen in Fig. 1.

Fig. 5A is somewhat different from Fig. 5 in that I employ an overshot rotary impeller, such for instance as a comb or the cylinder 29x and rotate the shaft 28 opposite to the manner shown in Fig. 5. Thus the channel bars 34x are superposed over the cylinder 29x. I may also employ a four winged beater 89 mounted upon a beater shaft 88 forward of the cylinder 29x and beyond the edge 24 and above the three spiraled impeller illustrated. The impeller and beater elements cooperate to direct the flow of the straw stream upwardly over the cylinder bars 30x for thrashing purposes and delivery to the slatted raddle 37 for a continuation to the racks in the separator body 10.

In my invention, harvested straw, or similar elements, is drawn under the tubular element 59 by the rotation of the spiral conveyor 43, which thus serves to distribute and arrange the flowing straw longitudinally of the hood 17 in the trough 17y and under the top 17x as an abutment. Now when this material has advanced off the end 43x of the screw conveyor 43, it is advanced against the screw end 73x of the more rapidly rotating spiral impeller 66. The screw 73 thus serves to receive, draw and increase the velocity of the longitudinally flowing straw stream as it leaves the hood 17 to enter the feeding chamber 21. This greater velocity of the straw stream at this point eliminates the tendency of the slower moving incoming longitudinally flowing straw stream to run into and crash the advanced straw stream skidding rearwardly around the corner 48 during its impelled distribution over the width of the chamber 22. This greater velocity of the straw stream as actuated by the various elements of the high speed impeller 66 also causes short fluffy straw to penetrate the band of air 51 or so that the objectionable situation outlined in the description of Fig. 7 does not occur.

It is obvious that the trough 17y may be varied and that the top element 17x may be projected from the rear wall of the hood at the most advantageous relationship to the spiral conveyor; and that the pitch of the screw 73 may be varied along its length to most effectually cause rearward travel of harvested elements while permitting a uniform distribution across the full face of the thrashing cylinder.

Such modifications may be employed as lie within the scope of the appended claims. Having fully described my invention, what I now claim as new and desire to secure by Letters Patent is:

1. A composite conveyor mechanism for the conveyor and blower casings of a machine of the class described comprising a rotary spiral element as a primary conveyor and a rotary blower as a secondary conveyor in axial alignment with the primary conveyor and in an end to end receiving relation thereto; said blower having blades and carrying a screw end terminating short of the delivery end of the spiral element and means for rotating the primary conveyor at a selected number of revolutions per minute and other means for rotating the secondary conveyor at a greater number of revolutions per minute than the primary conveyor.

2. In a machine of the class described; a composite conveyor mechanism, for a conveyor casing and a vented blower casing into which the conveyor casing discharges at one end, comprising a spiral element as a primary conveyor operating in the conveyor casing and a blower as a secondary conveyor operating in the blower casing in axial alignment with the primary conveyor and in an end to end receiving relationship thereto; a pair of bearings at one end as a mounting for the paired conveyors, a single bearing at the opposite end as a mounting for the shaft of one conveyor and a fourth bearing on said shaft intermediate the first and second sets of bearings as an end mounting for the other conveyor; and means for rotating the primary conveyor on its bearings at a selected number of revolutions per minute and other means for rotating the secondary conveyor on its bearings at a greater number of revolutions per minute than the primary conveyor.

3. In a machine as described in claim 2, characterized by the further fact that said blower has a plurality of blades and a screw having an end terminating short of the delivery end of the spiral element.

4. In a machine of the class described; a composite conveyor mechanism, for a conveyor casing and a vented blower casing into which the conveyor casing discharges at one end, comprising a spiral element on a tubular structure as a primary conveyor operating in the conveyor casing, a shaft extending through the tubular structure and carrying a blower mechanism at one end as a secondary conveyor operating in the blower casing beyond the delivery end of the primary conveyor; a main bearing and support for the driven end of the blower shaft, a main bearing and support for the outer end of the tubular structure and a pair of bearings for the tubular structure, one at either end thereof, mounted on the shaft; and means for rotating the driven blower shaft at a selected number of revolutions per minute and other means for taking power off the opposite end of said shaft and for driving the primary conveyor at a lesser number of revolutions per minute than the secondary conveyor.

5. In a machine as described in claim 4, characterized by the further fact that the blower has blades and a screw end leading therefrom towards the delivery end of the spiral element.

6. In a machine as described in claim 4, characterized by the further fact that the first means includes a driven sprocket on said shaft and the second means includes a driving sprocket at the opposite end of said shaft, a driven sprocket on the primary conveyor structure and means for transmitting power from the driving sprocket on the shaft to the driven sprocket on the primary conveyor.

7. Means for preventing congestion and backfeeding in a conveyor casing and a blower exhaust casing into which the conveyor casing discharges at one end comprising a composite duplex conveyor mechanism including a tubular element carrying a spiral as a primary conveyor for promoting longitudinal travel and a shaft carrying a blower as a receiving secondary conveyor and discharge element; said tubular element being rotatably mounted upon said shaft forward of the blower and means for rotating said secondary and primary conveyors at a greater and lesser number of revolutions per minute, respectively.

8. A duplex conveyor mechanism for a conveyor casing and a blower exhaust casing into which the conveyor casing discharges at one end comprising a tubular element carrying a spiral as a primary conveyor and a shaft concentric with and extending through and beyond both ends of the tubular element provided with a blower mechanism integral with said shaft arranged beyond the delivery end of the primary conveyor and in a receiving relation thereto; a main bearing and bearing support for the tubular element at the driven end thereof and another bearing adjacent thereto concentrically arranged intermediate the tubular element and the blower shaft as a mounting for said shaft at said end and another bearing beyond the blower in a bearing support carrying said shaft, and a fourth bearing on said shaft supporting the delivery end of the primary conveyor.

9. In a device as described in claim 8; characterized by the further fact that means are provided for rotating the primary conveyor and the blower simultaneously, but with the blower rotating at a greater number of revolutions per minute than the primary conveyor.

In testimony whereof I affix my signature.

WILLIAM C. EDWARDS, Jr.